Patented June 5, 1951

2,555,712

UNITED STATES PATENT OFFICE 2,555,712

PASTE MOLD

Rowland D. Smith, Corning, N. Y., assignor to Corning Glass Works, Corning, N. Y., a corporation of New York No Drawing. Application January 8, 1949, Serial No. 69,980

7 Claims. (Cl. 49—69)

This invention relates to glass-shaping molds and is particularly concerned with an improvement in the use of metal blow-molds of the type known as paste molds.

Paste molds are characterized by a smooth glass-contacting surface which is usually carbonaceous and porous and may consist of a thin layer of boiled linseed oil that has been dusted with powdered cork and then baked at a temperature of 200–300° C. Molds of this type are widely used in both machine and hand glass-blowing operations and are particularly adapted for the production of articles which are symmetrical about at least one axis. Articles produced in this manner include incandescent lamp bulbs, Christmas tree ornaments, blueprint cylinders, coffee maker bowls, and the like.

Such molds are capable of producing ware having a smooth surface free from seams, pits, or other undesirable marks. Their successful operation depends on adequate lubrication between the mold and the glass, one of which is rotated relatively to the other during the blowing operation. Otherwise, the mold surface becomes roughened by uneven wear and gives the glass surface a dull appearance, with the result that, as such irregularities become more pronounced, rings and streaks are formed in the glass and twisted or warped ware is produced.

The lubrication of paste molds is dependent on steam produced by the hot glass from water retained on the paste surface during the cooling of the molds, such steam forming a cushion between the mold and the glass. Adequate lubrication is not always provided by the conventional porous carbonaceous pastes, however, particularly on machines operating at high rates of speed, and the resulting mold wear with the accompanying frequent shut-downs necessary for mold change and the poor appearance of the ware obtained can become serious in the maintenance of a high production rate.

I have now discovered that more satisfactory lubrication can be provided with an increase in the production of acceptable ware by the application of a cold water-soluble cellulose ether to the glass-contacting surface of the paste mold. In the preferred manner of carrying out my invention, an aqueous solution of such a cellulose ether is suitably applied to the glass-contacting surface of a paste mold, which is then heated to vaporize the water and deposit the cellulose ether on the surface thereof. Advantageously, this heating is effected as the result of a normal glassblowing operation, following which the mold is wet with cooling water, the cellulose ether taking up water as the mold cools. The mold is then ready for the shaping of another gob of glass, this cycle of heating and cooling being repeated as desired.

Cold water-soluble cellulose ethers are unique in that heating of their solutions in cold water causes precipitation or gelation, the precipitate or gel of the cellulose ether redissolving upon subsequent cooling. The temperature range within which such gelation ocurs is small and sharply defined, and is a function not only of the concentration of the cellulose ether, but also of its viscosity type, such temperature decreasing with an increase in concentration or an increase in viscosity type.

It is this unusual property, I have found, that makes these cellulose ethers so unexpectedly useful in the lubrication of paste molds. Because of this property they are able to take up a considerable amount of water during cooling of the mold and to hold it evenly distributed over the glass-contacting surface until the heat from the gob of glass to be molded vaporizes such water to form a cushion of steam against which the glass can be turned and blown.

Of the various cellulose ethers of this type, I prefer to use cold water-soluble methyl cellulose, for it is the most readily available and can be obtained in a wide range of viscosity types, considerable flexibility in its application thereby being possible. Other cellulose ethers of this type, including cold water-soluble ethyl cellulose, cold water-soluble carboxymethyl cellulose, and cold water-soluble hydroxyethyl cellulose, can also be used, however.

In carrying out my invention, I first prepare a suitable aqueous solution of the cellulose ether to be employed, a less viscous solution being made up for use on molds utilized on automatic glass-blowing machines, and a more viscous solution being made up for use on hand molds. This solution is then applied to the glass-contacting surface of the mold, advantageously by spraying or dipping in the case of the machine molds and by simply painting on in the case of the hand molds. A gob of glass is then introduced into the treated mold and blown into shape therein, the heat from the glass vaporizing the water to form the desired steam cushion. Cooling water is next applied to the mold in accordance with conventional practice, and this cycle of glass molding and mold cooling repeated as desired.

The heat from the initial molding apparently deposits the cellulose ether throughout as well as on the porous carbonaceous paste surface. It appears that the deposited cellulose ether takes up some of the cooling water or assists the carbonaceous paste in retaining sufficient water to produce an adequate lubricating cushion of steam. Whatever the actual explanation may be, however, it is certain that the use of these cellulose ethers provides a more even and a more satisfactory lubrication and prolongs to a surprising extent the useful life of paste molds through prevention of excessive wear of the mold surface and on automatic machines helps to eliminate shut-downs for mold changes, even on long runs, with a substantial reduction in the loss of commercially acceptable ware. Because of this improved cooling water retention caused by the deposited cellulose ether, moreover, better cooling of the mold and increased protection against premature deterioration of the paste coating are provided.

In practice I have found it desirable to apply the cellulose ether solution to the mold either continuously or periodically. Although the deposited cellulose ether is neither dissolved by a single cooling nor decomposed by a single heating to any appreciable extent, the repetition of these steps appears to gradually weaken and eventually destroys the effect of the cellulose ether deposited on a mold. For a given type of operation, those molds which have been treated and then retreated with the cellulose ether have a longer life than those molds so treated only once.

The cellulose ether can be applied directly to a freshly prepared mold prior to its use. With a properly prepared paste mold, however, the cold water-soluble cellulose ether need be applied thereto only after it has been in use for some time. As with periodic application of the cellulose ether, the time of such initial application can be readily determined from experience and from the appearance and quality of the ware being produced.

The concentration of the cellulose ether solution may vary widely in accordance with the particular cellulose ether utilized and the particular viscosity type thereof selected, the type of glass-blowing operation, the type of mold and the specific paste coated thereon, the manner of application of the cellulose ether solution, the particular ware being blown, the nature of the glass, and the like. In general, the concentration should not be so great that the solution is too viscous for application, nor should the concentration be so low that insufficient cellulose ether is deposited on the mold. Again, for continuous application the concentration should be relatively weak, for intermittent application as on automatic machines the concentration should be greater, and for occasional application as to hand molds relatively viscous solutions may be used. As an example, with cold water-soluble methyl cellulose the concentration may range from as low as on the order of 0.01% for continuous application to the molds on automatic machines to as much as about 5%, or even somewhat more in certain cases, for hand operations.

The following descriptions of the three different types of operations in which paste molds are generally utilized will serve to illustrate may invention:

*Automatic machine operation*

With a machine of this type, an example of which is described in Wood et al. 1,790,397, glass articles such as bulbs are automatically blown from a continuous ribbon of glass. The bulbs remain as part of the ribbon throughout the blowing operation and the molds are cycled on a continuous belt. As the molds are being returned between blowing operations, they pass through a continuous spray of cooling water.

In the application of the present invention to such a machine, the cooling water may be intermittently replaced by a suitable aqueous solution of a cold water-soluble cellulose ether, e. g., a 0.3% solution of 4000 c. p. s. (average absolute viscosity of a 2% aqueous solution at 20° C.) methyl cellulose in water. The frequency of such replacement and the duration of each treatment may be controlled automatically or manually at the discretion of the operator. For example, in the production of a given article, the above methyl cellulose solution may be sprayed onto the molds as often as once every 15 minutes or so, the total time of spraying amounting to about 15 seconds, or as infrequently as once every other hour or so, the duration of each spray being on the order of a minute or longer. The particular manner of application depends on the type of ware being blown, as well as the speed of operation of the machine. Care must be taken not to deposit too great an amount of the cellulose ether on the mold so as to avoid the production of slack-blown or undersized ware.

The superior lubrication obtained by the application of the present invention to this type of machine results in three significant production improvements; namely, (1) decrease in rejection of ware due to twisted necks, (2) increased life of molds, and (3) improved appearance of the ware. Illustrative of these advantages is the fact that, whereas in the production of bulbs used in 40-watt incandescent lamps, the life of a set of untreated molds has averaged about 20 hours, on a recent run where methyl cellulose was applied to the molds near the end of the 20th hour it was possible to continue the run for an additional 7 hours without difficulty and without excessive twist or warpage, and with an improved appearance of the ware. While the run was stopped at that time because of a mechanical failure in the machine, the glass-contacting surfaces of the molds were found to be in excellent condition and could have been used for a much longer period of time. In another run such bulbs were produced continuously for a period of 38 hours by intermittently applying methyl cellulose to the molds for a total of approximately 1 minute an hour. At the end of the run the molds were examined and found to be in satisfactory condition and still capable of further acceptable production.

In another instance, on a machine making bulbs for 100-watt incandescent lamps, the average mold life had been 48 hours. With the intermittent application of methyl cellulose to the molds, runs as long as 102 hours have been completed. Since the molds, when taken off at the end of even the longest run to change to another type of ware, were found to be still good, it is not known how long a run would have been possible. The importance of this factor is at once apparent from the fact that a shut-down to replace worn molds may cause a loss of as much as 1½ hours of production amounting to 50,000 to 75,000 pieces of ware.

Improved appearance of the ware produced by such a machine is evidenced by the fact that the occurrence of mold rings and other surface markings is substantially diminished. This matter is of considerable importance, especially in such instances as where bulbs are to be painted or enameled, in that it is possible to apply a more even coating with a more uniform color in the finished product.

Semi-automatic machine operation

In a typical machine of this type, an example of which is shown in Chamberlin 1,124,702, a hand-gathered gob of glass is placed in the mold and rotated, the desired shape being imparted to the glass by automatic blowing. Following the blowing operation, the mold is dropped away from the ware into a pan of cooling water. Replacement of the cooling water with a 0.1% solution of 4000 c. p. s. methyl cellulose results in an appreciable extension of the life of the mold and a distinct improvement in the appearance of the ware, especially in the production of ware from borosilicate glasses, which are particularly hard on a paste mold because the high temperatures required for the working thereof tend to destroy the paste coating rather quickly.

Hand operation

A 2% solution of 4000 c. p. s. methyl cellulose in cold water is prepared, and the somewhat jelly-like solution is painted on the cold glass-containing surface of a conventional hand paste mold. Blowing operations are started immediately, the pressure and the heat of the glass in the first blowing operation serving to smooth and deposit the methyl cellulose uniformly over the surface. The mold is then cooled with water in the usual manner, the cycle of blowing and cooling being repeated as often as desired. Further application of methyl cellulose to the mold can be made as the gaffer sees fit.

The improved lubrication obtained by the use of the methyl cellulose enables easier ware rotation and permits the fabrication of such large objects as 6" to 12" diameter blueprint cylinders with a material reduction in the amount of ware rejected for flat surfaces caused by uneven rotation during the blowing process. In addition, with this procedure the conventional messy, dirty application of oils or waxes is replaced by a clean operation involving the use of only an aqueous solution.

I claim:

1. A paste mold made of metal and having a porous, carbonaceous glass-contacting surface containing a cold water-soluble cellulose ether.

2. A paste mold made of metal and having a porous, carbonaceous glass-contacting surface containing a cold water-soluble methyl cellulose.

3. In the shaping of hot plastic glass in a paste mold having a porous, carbonaceous, glass-contacting surface, the step of applying an aqueous solution of a cold water-soluble cellulose ether to the glass-contacting surface of the mold prior to the shaping of the glass therein.

4. The method as claimed in claim 3 in which the cold water-soluble cellulose ether comprises a cold water-soluble methyl cellulose.

5. The method of forming hot plastic glass in a paste mold having a porous, carbonaceous, glass-contacting surface, which comprises the steps of alternately blowing hot plastic glass to shape within the mold and cooling the mold, and of intermittently applying an aqueous solution of a cold water-soluble cellulose ether to the glass-contacting surface of the mold between glass-shaping operations.

6. The method of forming hot plastic glass in a paste mold having a porous, carbonaceous, glass-contacting surface, which includes the steps of applying an aqueous solution of a cold water-soluble cellulose ether to the glass-contacting surface of the mold, heating the mold to vaporize the water and to deposit the cellulose ether on the glass-contacting surface, and thereafter alternately wetting such surface with cooling water and blowing hot plastic glass to shape within the mold.

7. In the method of shaping hot plastic glass in a paste mold having a porous, carbonaceous, glass-contacting surface wherein the alternate and repeated operations of shaping glass within the mold and applying cooling water to the mold surfaces including the glass-contacting surface thereof are performed, the step of applying an aqueous solution of a cold water-soluble cellulose ether in place of such water at spaced intervals.

ROWLAND D. SMITH.

REFERENCES CITED

The following references are of record in the file of this patent:

UNITED STATES PATENTS

| Number | Name | Date |
| --- | --- | --- |
| 2,246,463 | Garratt | June 17, 1941 |
| 2,328,333 | Freeman et al. | Aug. 31, 1943 |
| 2,376,244 | Freeman et al. | May 15, 1945 |
| 2,410,422 | Breene et al. | Nov. 5, 1946 |

OTHER REFERENCES

Glass the Miracle Maker, by Phillips, Publ. by Pitman Publ. Corp., N. Y., 1941, Pages 167 and 168.